(12) United States Patent
Cho et al.

(10) Patent No.: US 7,651,132 B2
(45) Date of Patent: Jan. 26, 2010

(54) IMPACT ABSORBING SYSTEM OF STEERING COLUMN FOR VEHICLE

(75) Inventors: Young Nam Cho, Hwaseong (KR); Joon Mo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 312 days.

(21) Appl. No.: 11/641,448

(22) Filed: Dec. 19, 2006

(65) Prior Publication Data
US 2008/0012281 A1 Jan. 17, 2008

(30) Foreign Application Priority Data
Jul. 12, 2006 (KR) .................... 10-2006-0065457

(51) Int. Cl.
*B62D 1/18* (2006.01)
*B62D 1/19* (2006.01)
(52) U.S. Cl. .............. 280/777; 280/775; 74/493
(58) Field of Classification Search ........... 280/775, 280/777, 779; 74/492, 493
See application file for complete search history.

(56) References Cited
U.S. PATENT DOCUMENTS

| | | | |
|---|---|---|---|
| 6,224,104 B1 * | 5/2001 | Hibino | 280/777 |
| 7,219,927 B2 * | 5/2007 | Lee | 280/777 |
| 7,275,765 B2 * | 10/2007 | Camp et al. | 280/777 |
| 7,360,793 B2 * | 4/2008 | Hoshino et al. | 280/777 |
| 7,367,589 B2 * | 5/2008 | Stuedemann et al. | 280/777 |
| 2006/0290128 A1 * | 12/2006 | Ridgway et al. | 280/777 |
| 2007/0013180 A1 * | 1/2007 | Stuedemann et al. | 280/775 |
| 2007/0013183 A1 * | 1/2007 | Jensen et al. | 280/777 |
| 2007/0170711 A1 * | 7/2007 | Bechtel et al. | 280/775 |

* cited by examiner

*Primary Examiner*—Paul N Dickson
*Assistant Examiner*—James English
(74) *Attorney, Agent, or Firm*—Morgan, Lewis & Bockius LLP

(57) ABSTRACT

An impact-absorbing system of a steering column, which includes a mounting plate, an outer tube, an upper shaft, and a lower shaft. The impact absorbing system includes a mounting plate hole, a curling plate pin, a trans bracket coupled to the outer tube, a trans bracket hole, a curling plate, a curling plate guide, a mounting plate slot, and a curling guide coupling portion fixing the curling plate guide to the trans bracket and moving along the mounting plate slot in the event of collision.

6 Claims, 6 Drawing Sheets

IMPACT ABSORBING SYSTEM OF STEERING COLUMN FOR VEHICLE

CROSS-REFERENCE TO RELATED APPLICATION

This application claims priority to and the benefit of Korean Patent Application No. 10-2006-0065457 filed in the Korean Intellectual Property Office on Jul. 12, 2006, the entire contents of which are incorporated herein by reference.

BACKGROUND OF THE INVENTION (a) Field of the Invention

The present invention relates to an impact absorbing system for a vehicle steering column, and more particularly, to an impact absorbing system for a vehicle steering column, which allows a curling plate to effectively absorb impact by applying a curling plate guide over an existing curling plate.

(b) Description of the Related Art

Generally, a steering system is designed to transmit torque generated by a driver to the wheels of a vehicle. The steering system includes a steering wheel installed near a driver's seat, a steering shaft connected to a steering wheel, and a tube installed around the steering shaft which supports the steering shaft.

In the event of a collision, the steering column can reduce injury to the driver by absorbing impact through the molding force of a capsule, frictional force between inner and outer tubes, and deformation of the wheels.

Conventional steering columns typically absorb impact through the molding force of capsules mounted on a mounting plate. In addition, secondary impact absorption is achieved through frictional force between an inner tube and an outer tube.

However, the above-described conventional steering columns are difficult to design since the number and thickness of molded capsules need to be adjusted in order to set the molding force of the capsules. Furthermore, design changes to adjust the friction force between the inner and outer tubes are costly.

In addition, since the mounting plates are divided into an upper mounting plate and a lower mounting plate, vibrations are transmitted to the steering wheel when the vehicle is idling or traveling at high speeds. Furthermore, since the structure of the lower mounting plate is weak, it may become deformed during the assembly process.

In conventional motor-driven power steering columns, the presence of the electric motor not only significantly increases vibrations to the steering wheel, but also reduces the amount of available space for absorbing energy upon impact due to the reduced collapsible section of the steering column.

The above information disclosed in this Background section is only for enhancement of understanding of the background of the invention and therefore it may contain information that does not form the prior art that is already known in this country to a person of ordinary skill in the art.

BRIEF SUMMARY OF INVENTION

Figure 1:
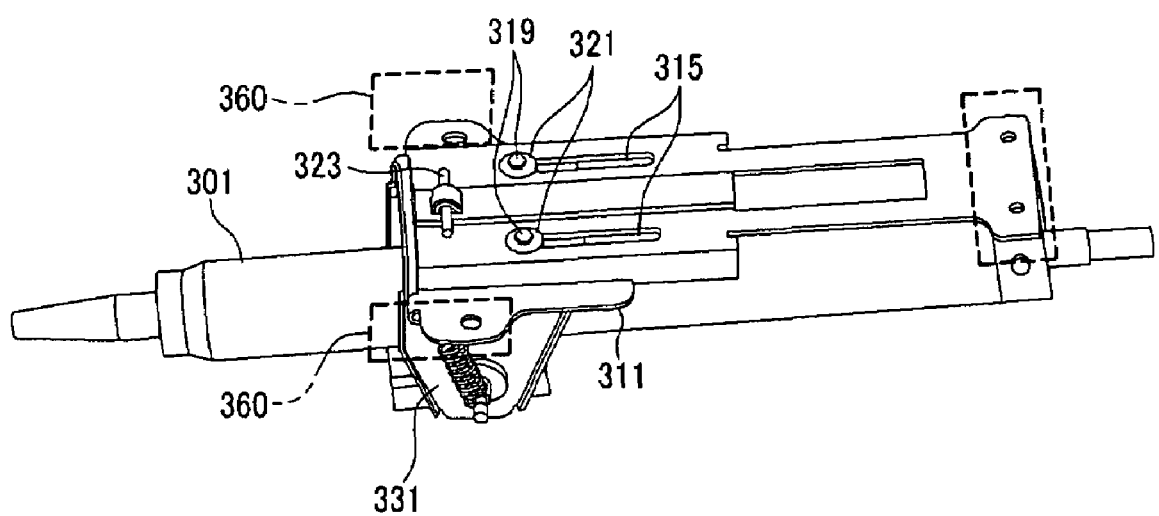
FIG. 1 is a perspective view of an impact absorbing system of a steering column for a vehicle according to an exemplary embodiment of the present invention.
Figure 2:
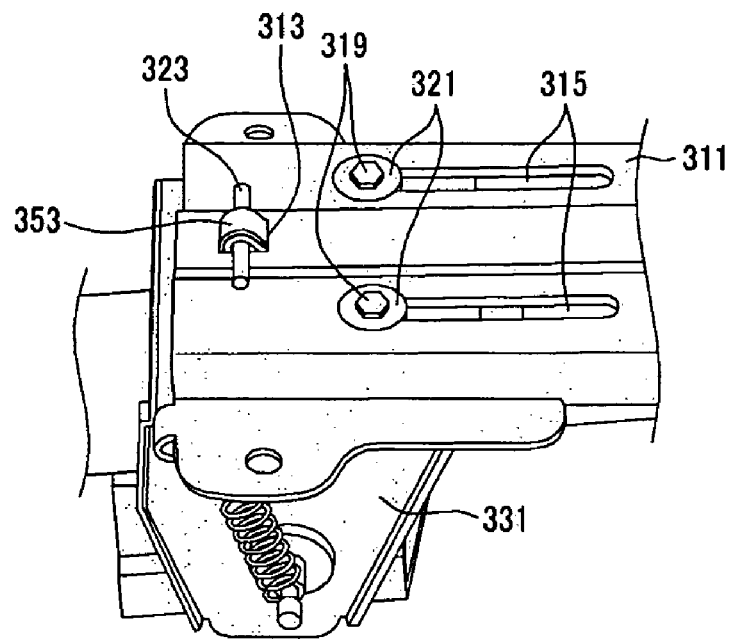
FIG. 2 is a partial enlarged perspective view of a coupling portion of a curling plate of FIG. 1.
Figure 3:
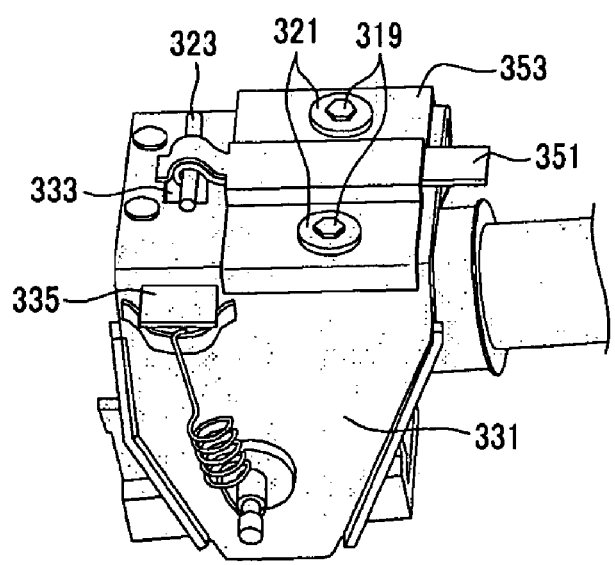
FIG. 3 is a partial enlarged perspective view illustrating a case when a mounting plate of FIG. 2 is removed.
Figure 4:
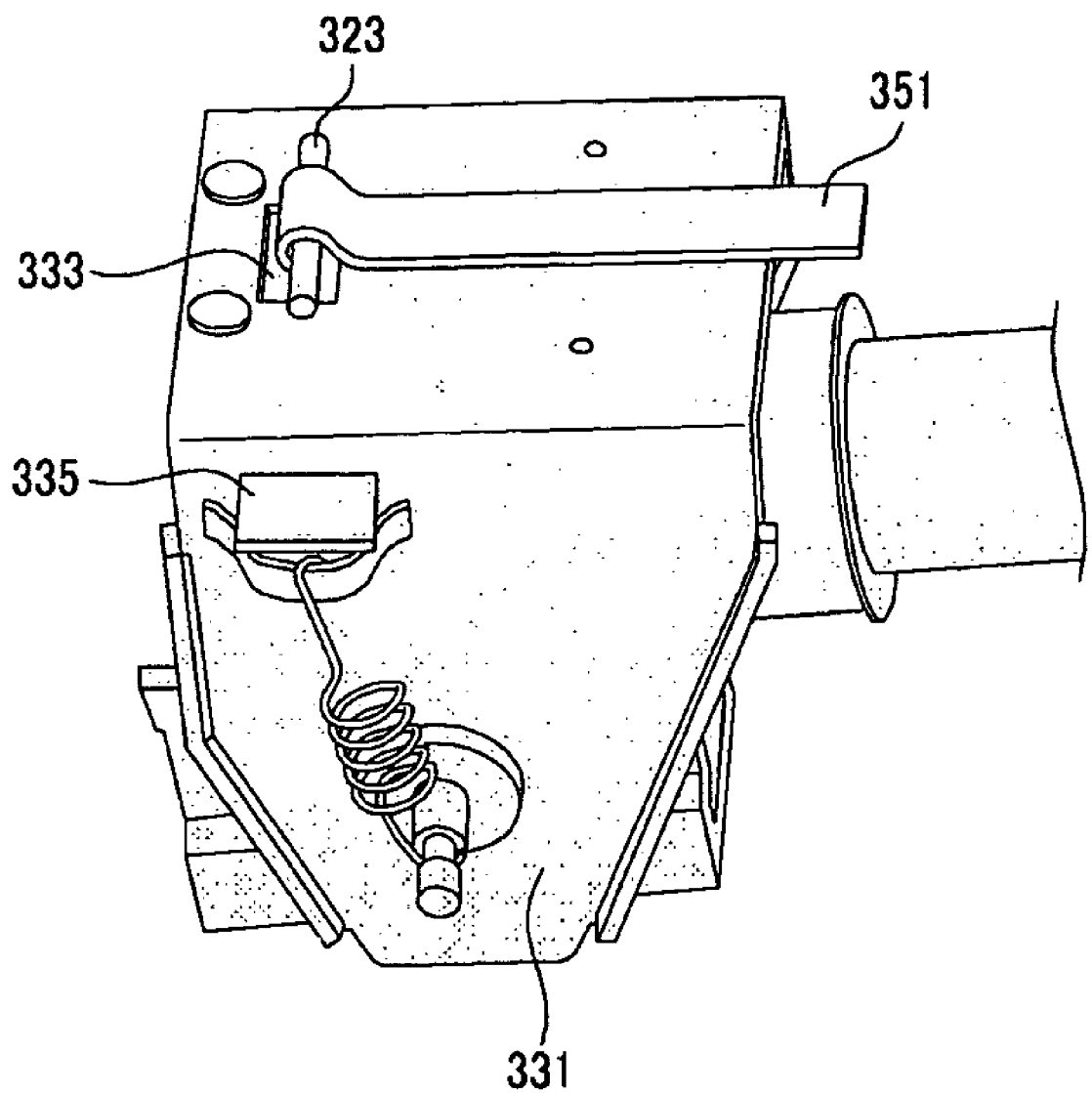
FIG. 4 is a partial enlarged perspective view illustrating a case when a curling plate guide of FIG. 3 is removed.

An exemplary embodiment of the present invention will hereinafter be described in detail with reference to the accompanying drawings.

An exemplary embodiment of the present invention provides an impact absorbing system of a steering column, which includes a mounting plate, an outer tube, an upper shaft, and a lower shaft, the impact absorbing system including a mounting plate hole formed on the mounting plate, a curling plate pin arranged above the mounting plate hole in a direction perpendicular to an axial direction of the steering column, a trans bracket coupled to the outer tube, a trans bracket hole formed on the trans bracket, a curling plate having an end fixed between the outer tube and the trans bracket, the outer tube passing through the mounting plate hole and being arranged between the mounting plate and the trans bracket in parallel to an axial direction of the steering column while wrapping around the curling plate pin, a curling plate guide covering the curling plate between the mounting plate and the trans bracket and coupled to the trans bracket, a mounting plate slot formed on the mounting plate and arranged in a direction parallel to the axial direction of the steering column, and a curling guide coupling portion fixing the curling plate guide to the trans bracket and moving along the mounting plate slot in the event of collision.

The curling guide coupling portion may include a bolt.

The curling guide coupling portion may further include a washer interposed between the bolt and the mounting plate.

The mounting plate may be monolithically formed as one piece.

The impact absorbing system may further include a trans bracket coupling portion formed by cutting a portion of the trans bracket in a U-shape at a portion where the trans bracket contacts the mounting plate and bent to contact the mounting plate, and a mounting plate coupling portion extending from a portion of the mounting plate and bent to cover the trans bracket coupling portion.

The upper and lower shafts are coupled to each other by a spline structure.

Another embodiment of the present invention provides an impact absorbing system of a steering column, which includes a mounting plate, an outer tube, an upper shaft, and a lower shaft, the impact absorbing system including a mounting plate hole formed on the mounting plate, a curling plate pin arranged above the mounting plate hole in a direction perpendicular to an axial direction of the steering column, a trans bracket coupled to the outer tube, a trans bracket hole formed on the trans bracket, a curling plate having an end fixed between the outer tube and the trans bracket, the outer tube passing through the mounting plate hole and being arranged between the mounting plate and the trans bracket parallel to an axial direction of the steering column while wrapping around the curling plate pin, a curling plate guide covering the curling plate between the mounting plate and the trans bracket and coupled to the trans bracket, a mounting plate slot formed on the mounting plate along an axis of the steering column, a curling guide coupling portion fixing the curling plate guide to the trans bracket and moving along the mounting plate slot during a collision of the vehicle, and an electric motor installed on the steering column.

The curling guide coupling portion may include a bolt.

The curling guide coupling portion may further include a washer interposed between the bolt and the mounting plate.

The mounting plate may be monolithically formed as one piece.

The impact absorbing system may further include a trans bracket coupling portion formed by cutting a portion of the trans bracket in a U-shape at a portion where the trans bracket contacts the mounting plate and bent to contact the mounting plate, and a mounting plate coupling portion extending partly from the mounting plate and bent to cover the trans bracket coupling portion.

The upper and lower shafts are coupled to each other by a spline structure.

DETAILED DESCRIPTION OF THE INVENTION

In some embodiments, the impact absorbing system of a steering column includes a mounting plate, an outer tube, an upper shaft, and a lower shaft. As illustrated by FIGS. 1-4, a coupling portion of a curling plate and a curling plate guide includes a mounting plate 311 having a mounting plate hole 313.

A curling plate pin 323 is arranged above the mounting plate hole 313 in a direction perpendicular to an axial direction of the steering column.

A trans bracket 331 is coupled to the outer tube 301. The outer tube 301 and the trans bracket 331 move integrally together during the collision of the vehicle.

The trans bracket 331 is provided with a trans bracket hole 333.

One end of the curling plate 351 is fixed between the outer tube 301 and the trans bracket 331. The curling plate 351 passes through the trans bracket hole 333 and the mounting plate hole 313 and wraps around the curling plate pin 323. More accurately, the curling plate 351 passes through the mounting plate 313. The curling plate 351 is disposed in parallel with the axial direction of the steering column between the mounting plate 311 and the trans bracket 331.

A curling plate guide 353 covering the curling plate 351 is coupled to the trans bracket 331 between the mounting plate 311 and the trans bracket 331. When the curling plate 351 collapses in a vehicle collision, the curling plate guide 353 allows the curling plate 351 to provide uniform frictional force and therefore to collapse stably.

A mounting plate slot 315 is formed on the mounting plate 311 and extends in a direction parallel to the axial direction of the steering column.

The curling plate guide 353 and the trans bracket 331 are both fixed by a curling guide coupling portion. The curling guide coupling portion moves along the mounting plate slot 315 in the event of a collision.

The curling guide coupling portion includes a bolt 319. In this case, the impact absorption amount can be adjusted by adjusting the tightness of the bolt 319.

The curling guide coupling portion further includes a washer 321 interposed between the bolt 319 and the mounting plate 311.

The mounting plate 311 is monolithically formed as one piece.

The following will describe an exemplary embodiment of the mounting plate and the trans bracket.

Figure 5:
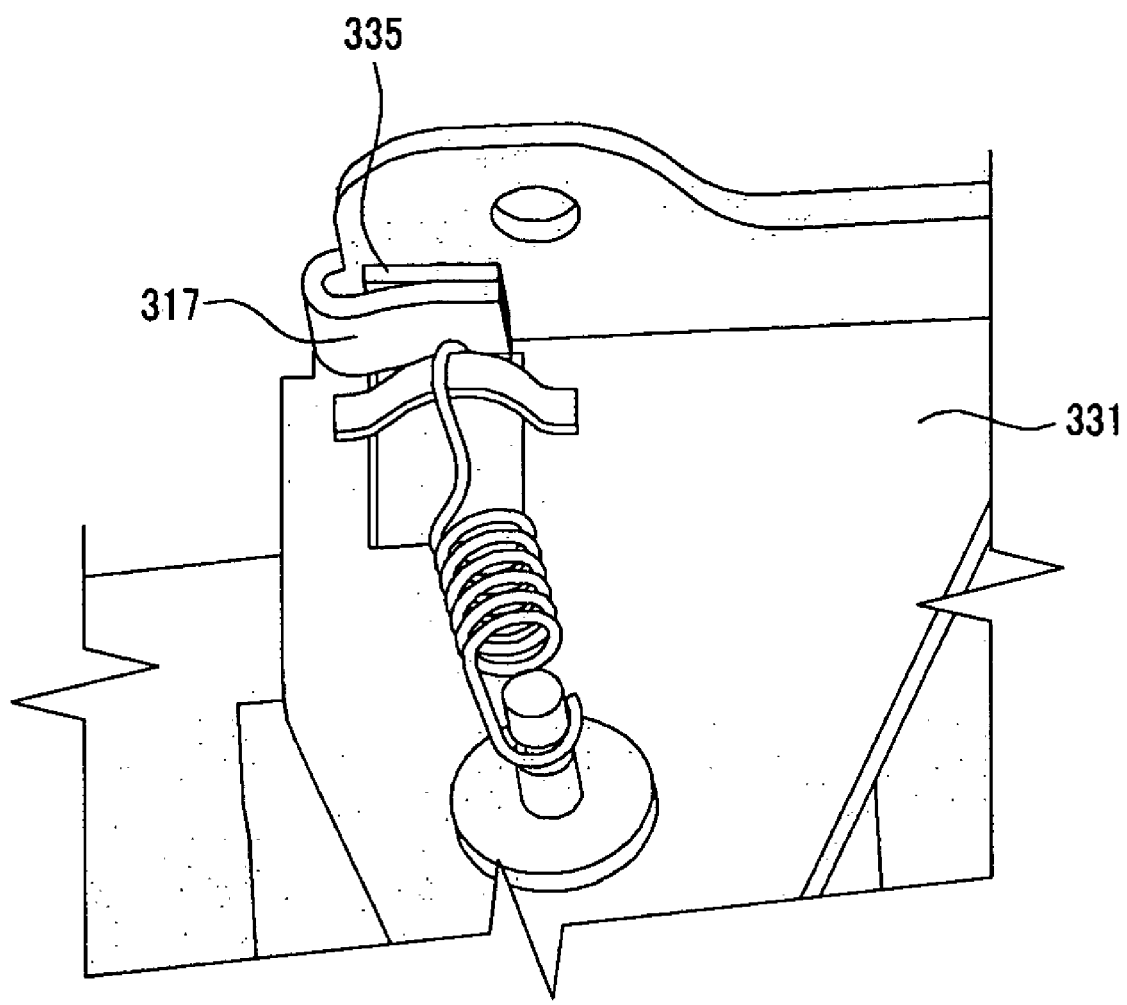
FIG. 5 is a partial enlarged perspective view of a coupling portion of a mounting plate and a trans bracket, when viewed from the bottom of FIG. 3.

Referring to FIG. 5, at a portion where the trans bracket 331 contacts the mounting plate 311, the trans bracket 331 is partly cut in a U-shape to form a trans bracket coupling portion 335. The trans bracket coupling portion 335 is bent to contact the mounting plate 311.

A mounting plate coupling portion 317 extends from the mounting plate 311 and is bent to cover and contact closely the trans bracket coupling portion 335.

The mounting plate coupling portion 317 and the trans bracket coupling portion 335 absorb firstly impact generated in the event of a vehicle collision. The coupling force of the mounting plate coupling portion 317 and the trans bracket coupling portion 335 is determined according to a degree of bending of the mounting plate coupling portion 317.

Figure 7:
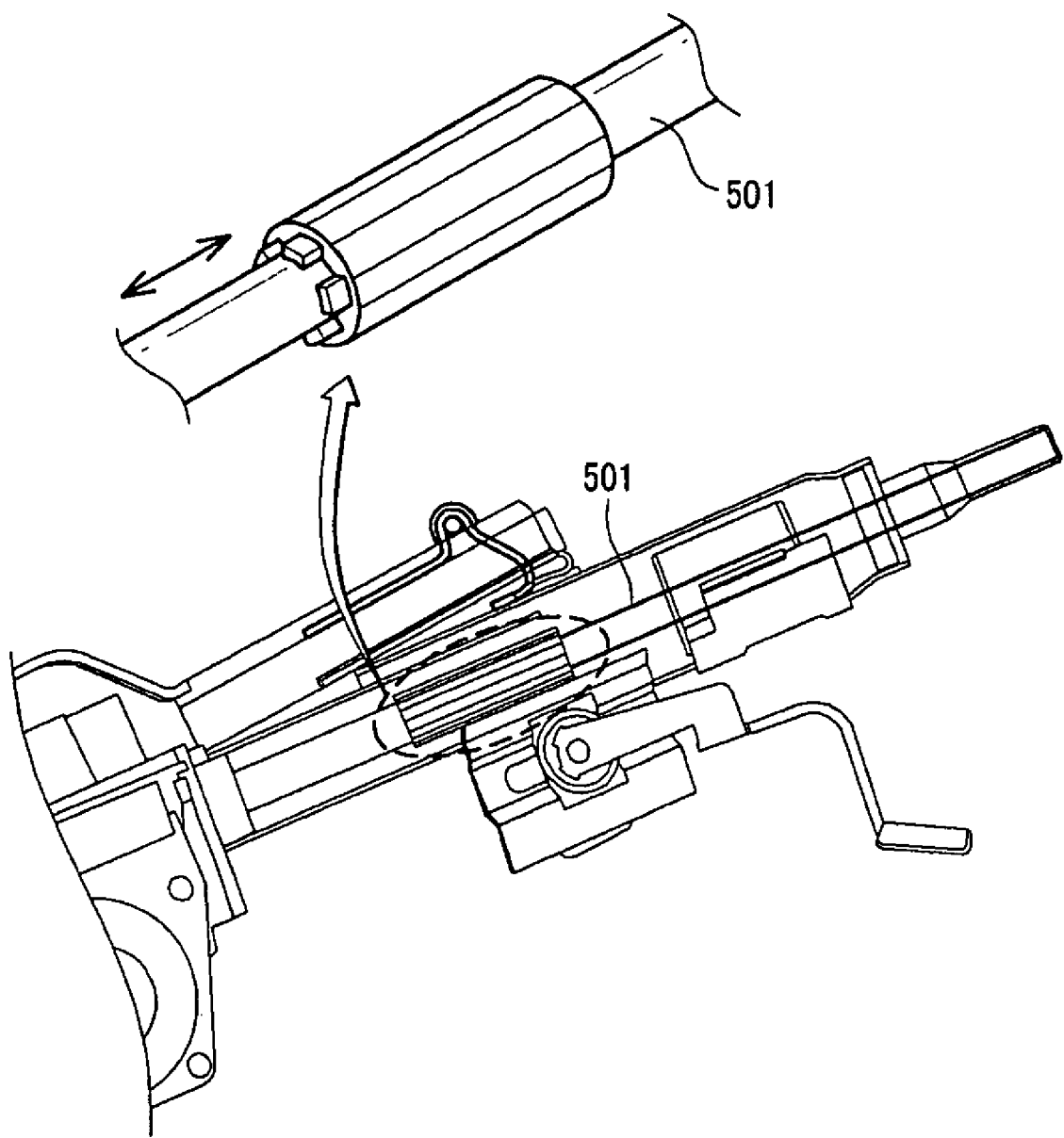
FIG. 7 is a view illustrating a coupling of an upper shaft and a lower shaft according to an exemplary embodiment of the present invention.

In some embodiments as illustrated by FIG. 7, a coupling portion 501 of the upper and lower shafts is formed in a spline structure.

In the prior art, the upper and lower shafts are typically coupled to each other by a shaft pin. Therefore, the impact generated by a vehicle collision is absorbed while breaking the shaft pin. However, impact is absorbed by the curling plate of the present invention, thereby permitting the upper and lower shafts to be coupled to each other by the spline structure.

The foregoing description illustrates how the concept of the present invention can be applied to an impact absorbing system of the general steering system. Moreover, the concept of the present invention can be applied to a motor driven power steering system.

Figure 6:
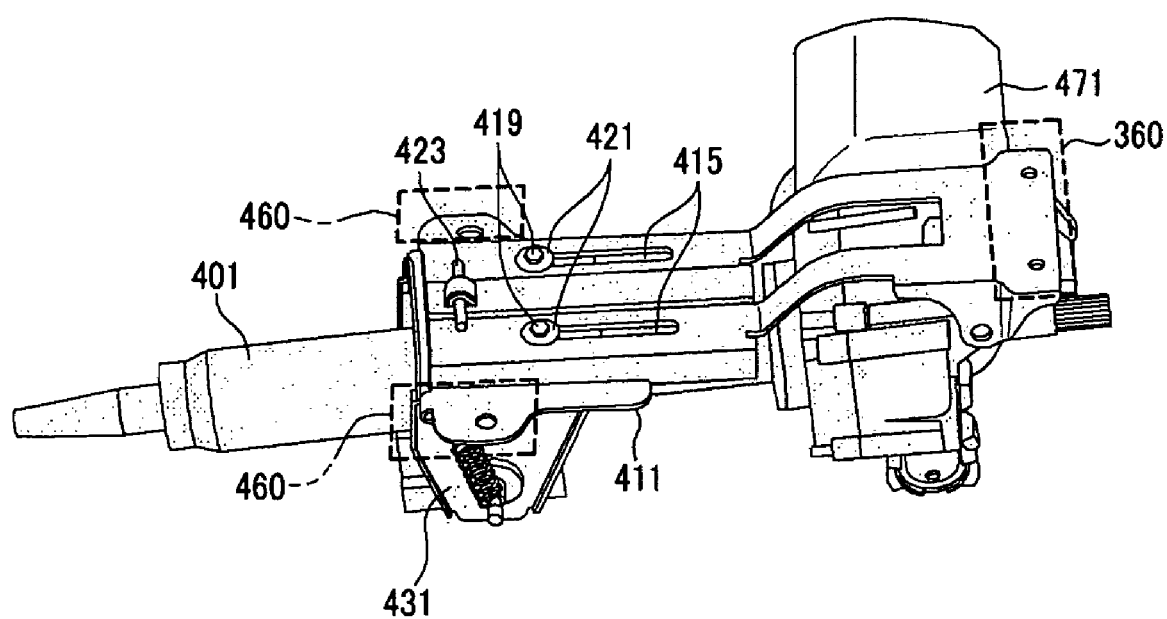
FIG. 6 is a perspective view of an impact absorbing system of a steering column having an electric motor for a vehicle according to an exemplary embodiment of the present invention.

A motor driven power steering system (MDPS) is identical to a general power steering system in its major components and functions except that an electric motor 471 is mounted. As illustrated in FIG. 6, an upper tube 401, a mounting plate 411, a mounting plate slot 415, a bolt 419, a washer 421, a curling plate pin 423, and a trans bracket 431 are provided, serving the same functions as detailed above.

The motor driven power steering column has a design problem in that the electric motor 471 reduces the collapsible section of the column and it is difficult to vary the diameter of the tube. When the above-described impact absorbing system is applied to the motor driven power steering system, it is easier and more economical to change the design as compared with the case where the frictional force of the tube or the shaft pin is used.

The impact absorbing system of the steering column for a vehicle according to the present invention has the following effects:

The curling plate and the curling plate guide are applied and thus the curling plate uniformly collapses to provide stable friction force in the collision of the vehicle, thereby protecting the driver from injury.

Since the bolt is applied to the guide coupling portion, the impact absorption amount can be easily adjusted.

A mounting plate is monolithically formed as one piece and therefore the rigidity of the steering column is improved. This rigidity prevents the wobbling of the steering wheel when the vehicle is idling or traveling at high speeds.

The coupling portion is used to join the trans bracket to the mounting plate, resulting in dispersal of impact in a vehicle collision.

When the curling plate and the curling plate guide are applied, the coupling of the upper shaft and the lower shaft is done with a spline structure, thereby making it easy to change the design.

When the impact absorbing system is applied to a motor driven power steering column, in which, due to the electric motor, the collapsible section is shorted and it is difficult to change the diameter of the tube, the above-described effects of the present invention can be further enhanced.

According to the present invention, since the impact absorbing system of the vehicle steering column absorbs the impact generated in the vehicle collision using the curling plate without using a molding pin, a shaft pin, and frictional force between tubes, the manufacturing cost can be reduced and it is easy to change the design according to the vehicle specifications.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An impact absorbing system of a steering column, which includes a mounting plate, an outer tube, an upper shaft, and a lower shaft, the impact absorbing system comprising:
    a mounting plate hole formed on the mounting plate;
    a curling plate pin arranged above the mounting plate hole in a direction perpendicular to an axial direction of the steering column;
    a trans bracket coupled to the outer tube;
    a trans bracket hole formed on the trans bracket;
    a curling plate having an end fixed between the outer tube and the trans bracket, the outer tube passing through the mounting plate hole and being arranged between the mounting plate and the trans bracket in parallel with an axial direction of the steering column while wrapping around the curling plate pin;
    a curling plate guide slidably covering the other end of the curling plate between the mounting plate and the trans bracket to guide a motion of the curling plate and coupled to the trans bracket;
    a mounting plate slot formed on the mounting plate and arranged in a direction parallel with the axial direction of the steering column; and
    a curling guide coupling portion fixing the curling plate guide to the trans bracket and moving along the mounting plate slot in the event of collision,
    a trans bracket coupling portion formed by cutting a portion of the trans bracket in a U-shape at a portion where the trans bracket contacts the mounting plate and bent to contact the mounting plate; and
    a mounting plate coupling portion extending from a portion of the mounting plate and bent to lock the trans bracket coupling portion against a predetermined amount of impact applied thereto, and
    wherein the upper and lower shafts are coupled to each other by a spline structure; and
    wherein the mounting plate is monolithically formed as one piece.

2. The impact absorbing system of claim 1, wherein the curling guide coupling portion includes a bolt.

3. The impact absorbing system of claim 2, wherein the curling guide coupling portion further includes a washer interposed between the bolt and the mounting plate.

4. The impact absorbing system of a steering column of claim 1, further comprising an electric motor coupled to the steering column.

5. The impact absorbing system of claim 4, wherein the curling guide coupling portion includes a bolt.

6. The impact absorbing system of claim 5, wherein the curling guide coupling portion further includes a washer interposed between the bolt and the mounting plate.

* * * * *